Nov. 26, 1940.　　　　F. S. SMITH　　　　2,222,634
APPARATUS FOR TREATING MATERIALS
Filed Aug. 6, 1937　　　　5 Sheets-Sheet 1

INVENTOR
Franklin S. Smith
BY
Blair, Curtis, Dunne + Haywood
ATTORNEYS

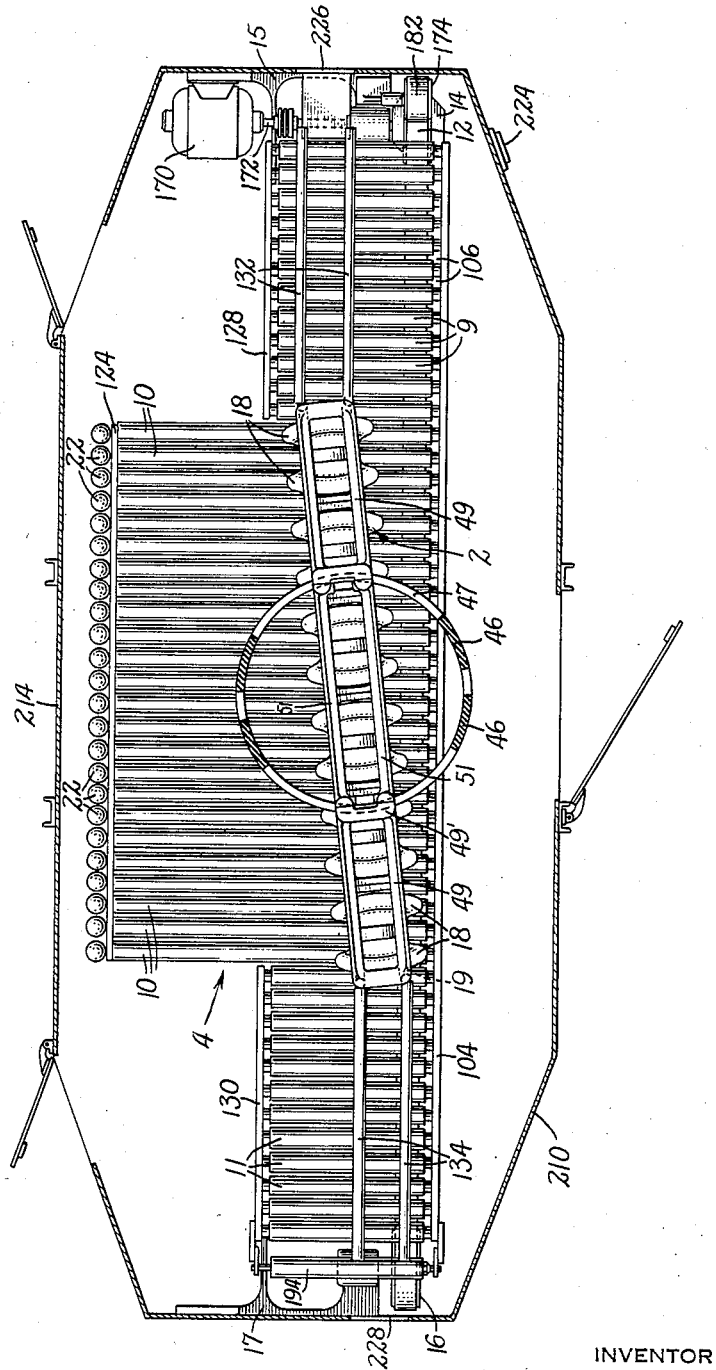

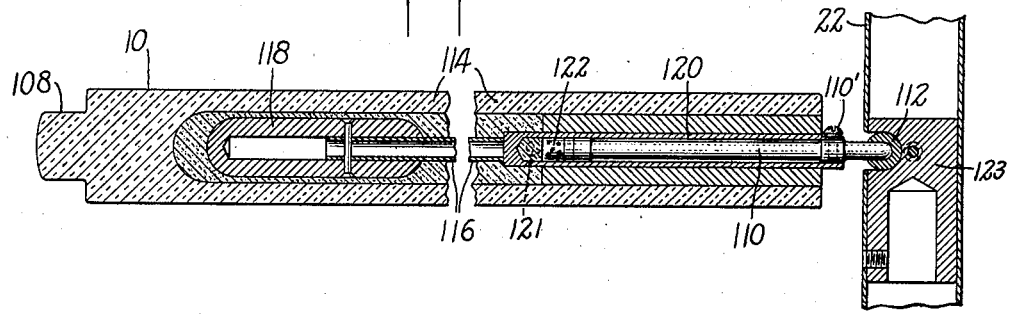
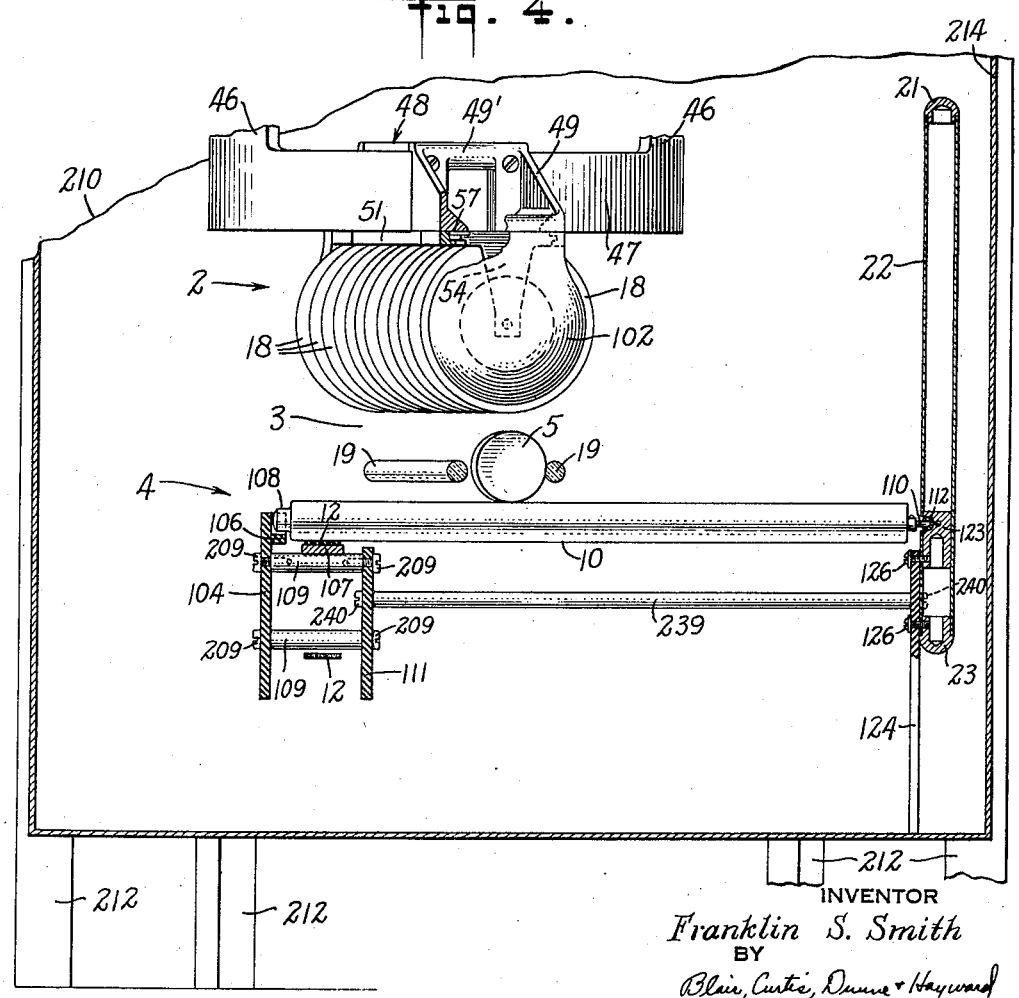

Nov. 26, 1940.  F. S. SMITH  2,222,634
APPARATUS FOR TREATING MATERIALS
Filed Aug. 6, 1937  5 Sheets-Sheet 4

INVENTOR
Franklin S. Smith
BY
Blair, Curtis, Dunne & Hayward
ATTORNEYS

Patented Nov. 26, 1940

2,222,634

UNITED STATES PATENT OFFICE 2,222,634

APPARATUS FOR TREATING MATERIALS

Franklin S. Smith, New Haven, Conn.

Application August 6, 1937, Serial No. 157,699

20 Claims. (Cl. 21—102)

This invention relates to an art and apparatus for treating food and other products and is especially concerned with sterilizing products by means of an electrical discharge.

One of the objects of this invention is to provide a thoroughly reliable art and apparatus for subjecting food and other products to a treatment in a dependable and practical manner without injury to the product. Another object is to provide an art and apparatus of the above character in which food or other products may be subjected to an electrical treatment. A still further object is to provide an art and apparatus of the above character wherein food or other products may be sterilized without injuring the product in any manner.

Another object is to provide a highly efficient and thoroughly practical art and apparatus of the above character which may be used to destroy insects or other life, including all eggs, larvae, and pupae. Another object is to provide an art and apparatus in which these various advantages are obtained and the various functions may be readily and efficiently controlled over wide ranges of usage.

Another object is to provide inexpensive apparatus of the above character, small in size and weight, and capable of dependable and safe operation. Other objects will be in part obvious and in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawings in which are shown some of the various possible embodiments of the electrical and mechanical features of my invention, Figure 1 is a front elevation of the apparatus, some parts being shown diagrammatically, some parts being broken away, and other parts being shown in section;

Figure 2 is a plan view showing the electrode structure and the path of the material with certain parts broken away;

Figure 3 is a horizontal sectional view of an electrode roller and the adjacent portion of the condenser member which helps support it;

Figure 4 is a vertical sectional view on the line 4—4 of Figure 1, certain parts being broken away and others omitted, showing a package in the treatment zone;

This application is a continuation-in-part of my copending application 747,441, filed October 8, 1934, now Patent No. 2,132,707, issued October 11, 1938.

The particular embodiment disclosed herein operates to pass products such as packages of food through a discharge zone where they are subjected to a high potential with the result that discharges take place within the products. When this apparatus is used in a manner explained in detail below, these discharges are of a corona-like disruptive nature and thoroughly treat the entire product. It has been found that highly practical and desirable results are thus obtained with apparatus which is light in weight, compact, and economical to build and use.

Figure 1:
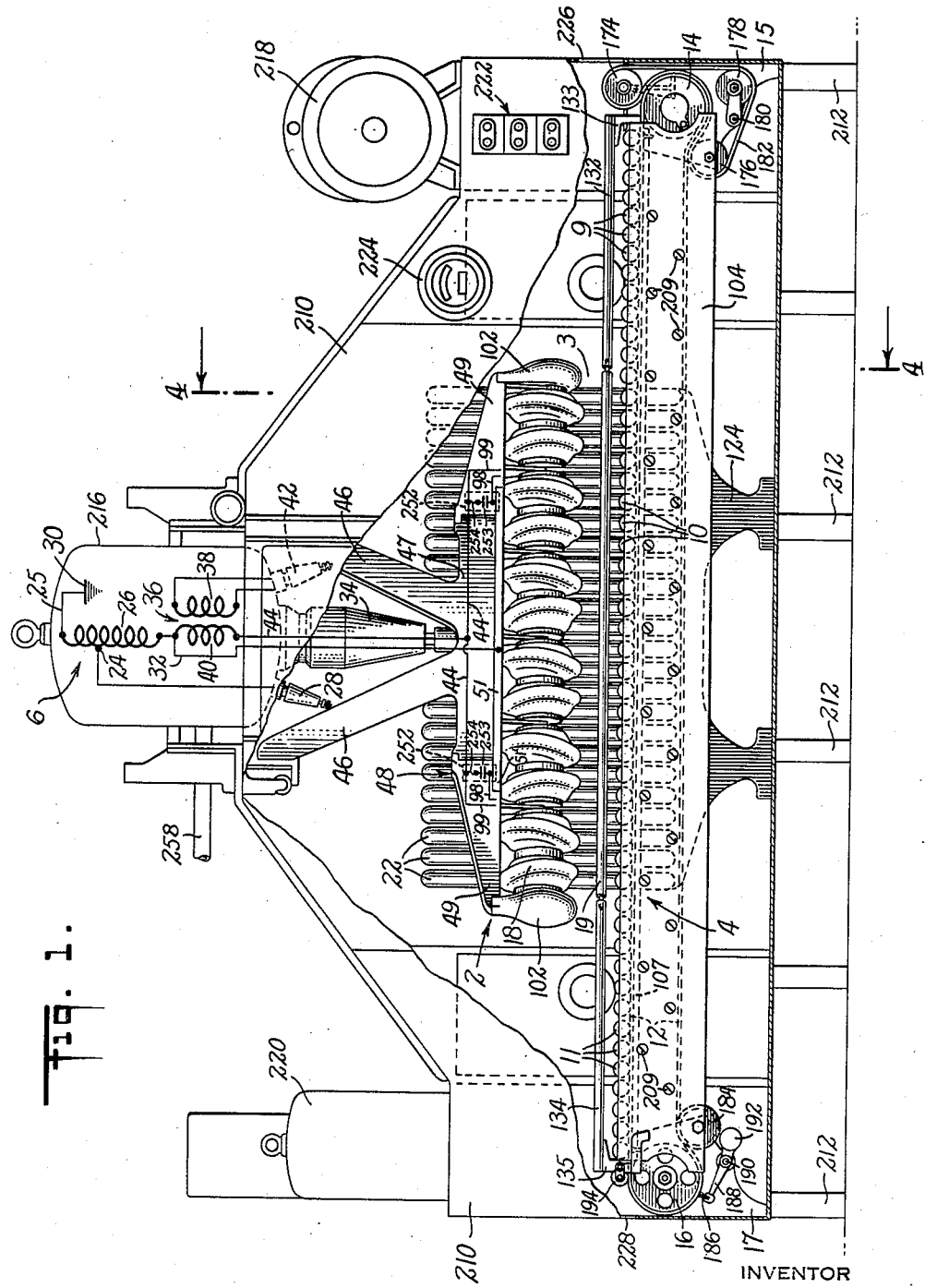

Referring to Figure 1, the apparatus includes upper and lower electrode structures, generally referred to by the numerals 2 and 4, respectively, having a discharge zone 3, therebetween. The product being treated is moved through this treatment zone and, at the same time, a high-frequency, high-potential voltage is impressed across the two electrode structures so as to cause a disruptive corona-like discharge through the product.

The product being treated enters the machine at the right (see also Figure 2) through opening 226, and leaves the machine at the left through opening 228, thus moving through the machine upon a roller conveyor system which includes a group of dielectric rollers 9 at the right, a group of electrode rollers 10 at the center, and a group of dielectric rollers 11 at the left. As will be described later, movement of the product is obtained by rotating the rollers, the path of the product being determined in some instances by means such as guide rails of dielectric material positioned above the roller conveyor (see Figures 1 and 2). These guide rails are in pairs, there being a pair 132 extending over rollers 9, a pair 19 extending over electrode rollers 10, and a pair 134 extending over rollers 11. Rails 19 are rotatably mounted in the adjacent ends of rails 132 and 134, rails 134 being supported at the left (Figure 1) by brackets 135, and rails 132 being supported at the right by brackets 133.

Rollers 9 and 11 and electrode rollers 10 are rotatably mounted, and are rotated by an endless belt 12 which contacts the under side of one end of each roller. Endless belt 12 is carried by pulleys 14 and 16 and is driven, through a speed reduction gear unit and pulley 14, by an electric motor 170 (Figure 2).

Figure 5:
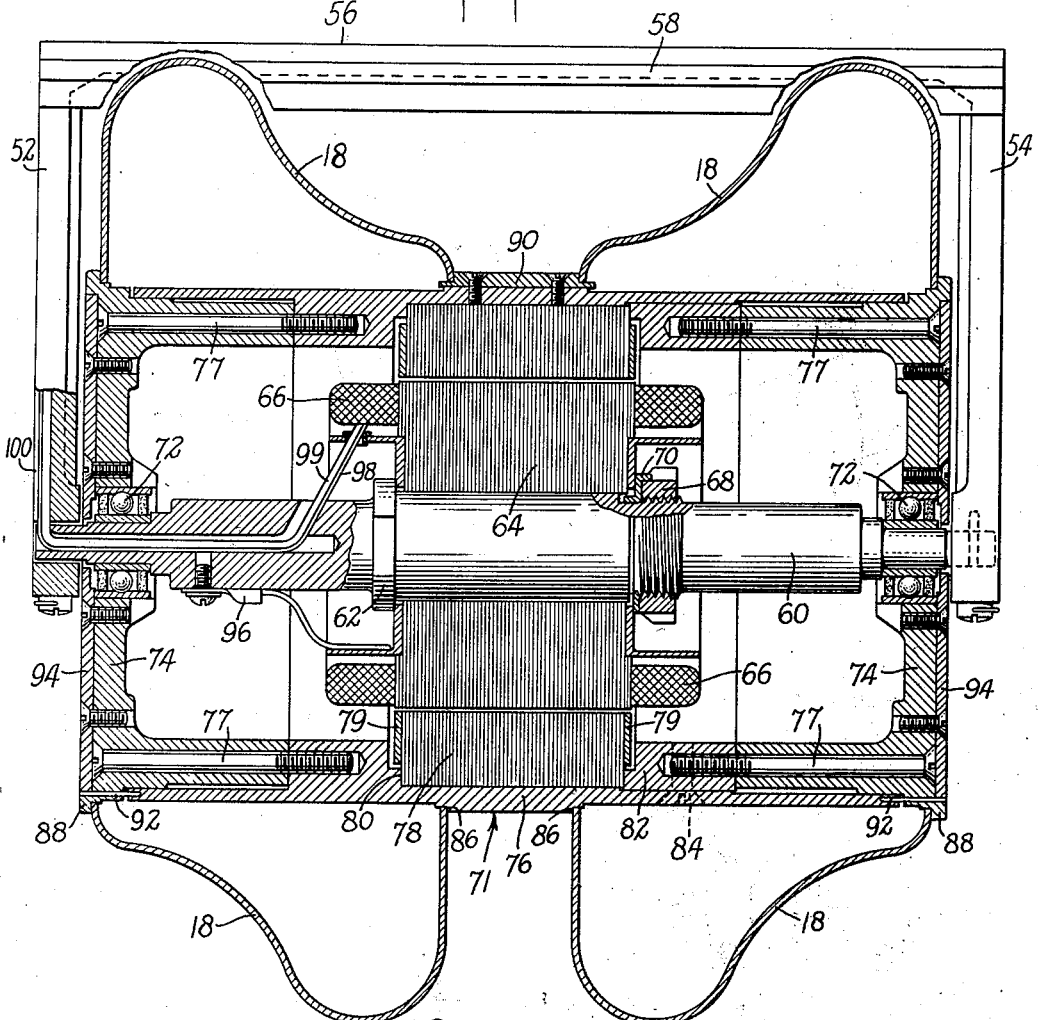
Figure 5 is a sectional view of one of the electrode structures.

The upper electrode structure 2 includes a plurality of electrode elements 18 which are rotatably mounted in pairs and in reversed or opposed relationship upon an elongated frame, referred to generally by the numeral 48. Each pair of electrode elements 18 is mounted, as shown in Figure 5, with an electric motor upon an inverted-U-bracket (see also Figure 7) to form an individual electrode mounting unit.

In this embodiment, the lower electrode structure comprises a plurality of electrode elements 118 of the type shown in Figure 3, each electrode element being mounted in a dielectric shell 114 and being electrically and mechanically connected to an elongated tube 116, tube-extension 120, and shaft member 110. Each of these electrode elements with its shell 114 and other supporting structure forms one of the electrode rollers 10, which are mounted as shown in Figure 4, being supported at the right upon a vertical condenser member 22, and at the left by a supporting bridge structure, all to be described in detail below.

Referring again to Figure 1, the entire apparatus is mounted in a casing 210 having legs 212 and sheet metal walls. The high-frequency, high-potential voltage is produced by apparatus similar to that shown in my prior Patent Number 1,975,805, issued October 9, 1934, and is mounted mainly upon the roof of casing 210; there being at the right, a high-frequency, low-voltage alternator 218; at the left a power-factor compensating resonance coil 220 and other voltage regulating means; and in the center, a high-voltage auto-transformer 6. Suitable control apparatus is mounted in casing 210 adjacent alternator 218 and includes switches 222 and voltmeter 224.

Auto-transformer 6 is mounted within casing 216, and receives the high-frequency, low-voltage of alternator 218 and transforms this into a high-frequency, high-voltage which is impressed across the electrodes to produce the disruptive corona-like discharge. Auto-transformer 6 is provided with a winding 26 which is connected at one end with lead 25, at an intermediate point with tap 24, and at the other end with lead 32. The low-voltage is impressed between tap 24, which enters casing 216 through terminal 28, and lead 25 which is grounded at ground connection 30, the high potential being between lead 32 and ground connection 30.

Mounted within casing 216 below transformer 6, is an insulation transformer 36, by means of which a suitable voltage is supplied to the motors which rotate the upper electrode elements 18. Transformer 36 has a primary winding 38 and a secondary winding 40 which are insulated from each other for the high-voltage of auto-transformer 6. Primary winding 38 is connected by means of suitable leads, through a pair of terminals 42 (only one of which is found on the drawings) to a source of alternating current (not shown). One terminal of the secondary winding 40, of transformer 36, is connected to lead 32 and the other terminal is connected to a lead 44. Leads 32 and 44 extend downwardly from casing 216 through high-potential terminal 34 and carry the high side of the high-frequency, high-potential to the electrode, and at the same time, carry a suitable voltage to run the motors which rotate the electrode elements 18, in a manner to be presently described. While transformer 36 is used herein only for insulating purposes, it may also be used to raise or lower the voltage being delivered to the electrode motors.

For obtaining certain advantages, an air condenser structure is provided in series with the discharge zone which includes a plurality of vertical condenser members 22 (best shown in Figure 4) which cooperate with the back wall 214 of the sheet metal covering. Vertical condenser members 22 are supported individually upon a dielectric bridge structure 124 (see also Figure 1), each vertical condenser member supporting one end of, and being electrically connected to, the electrode element of one electrode roller 10. In this manner, each lower electrode is connected in series with an individual condenser comprising its supporting vertical condenser member 22 and the portion of casing wall adjacent thereto.

Referring again to Figure 1, the upper electrode structure 2 is supported from the roof of casing 210 by an insulator which is formed by cutting segments from a cylinder of insulation material and which has four downwardly extending arms 46. The upper ends of arms 46 are attached to casing 210 through a worm-gear adjustment capable of regulating the position of electrode structure 2 with respect to lower electrode structure 4. Integral with the lower ends of arms 46 is a ring portion 47 to which is rigidly attached the elongated frame 48 of electrode structure 2.

As best shown in Figure 2, elongated frame 48 comprises a center section formed of two parallel center beams 51 extending across ring portion 47, and two end sections 49 which are in alignment with center beams 51 and extend to the right and left therefrom beyond ring portion 47 (see also Figure 1). Center beams 51 are provided with flanges 51' extending beneath ring portion 47 and the adjacent ends of end portions 49; end portions 49 are provided with flanges 49' which extend over ring portion 47. Suitable set screws hold portions 49 and center beams 51 in this interfitting relationship, thus, rigidly attaching elongated frame 48 to ring portion 47.

Figure 6:
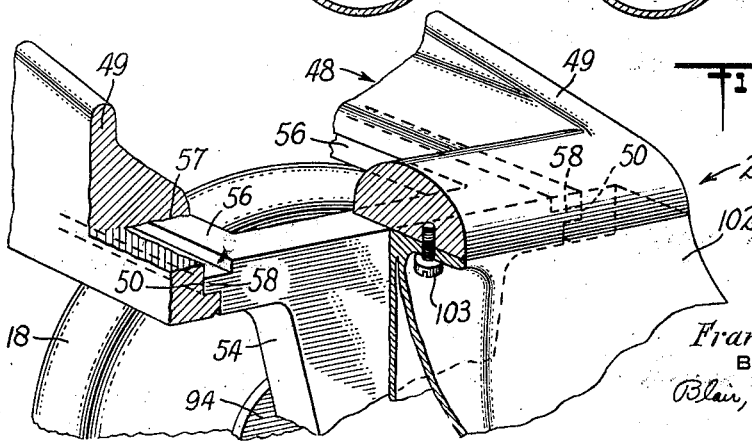
Figure 6 is a view with certain parts broken away, showing a portion of the mounting means for the upper electrode units.
Figure 7:
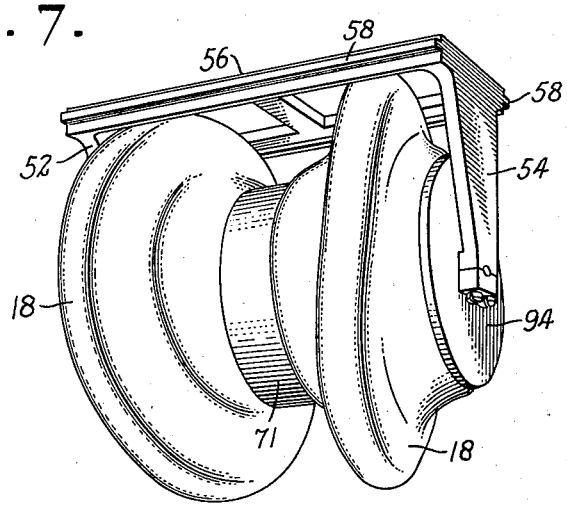
Figure 7 is a perspective view of an upper electrode assembly unit.

As pointed out above, each of the electrode assembly units, shown in Figures 5 and 7, is mounted upon an individual inverted-U-bracket, which has two downwardly extending arms, 52 and 54, connected at the top by a cross-frame 56 (see also Figure 6).

Elongated frame 48 is provided throughout its length with a downwardly opening channel 57 to receive cross-frames 56 of the electrode assembly units. Channel 57 has a groove 50 along each of its side walls and, in a like manner, cross-frame 56 is provided along its sides with ribs 58 which are received in grooves 50. In assembly, the cross-frame 56 of each electrode assembly unit is pushed into the end of channel 57 with ribs 58 interengaging with grooves 50. When all of the electrode assembly units are in position, static shields 102 are secured in place by means of screws 103. Static shields 102 perform the function of retaining the electrode assembly units in place and also shield the upper electrode structure 2 to assist in providing uniform treatment and to avoid sparking.

Referring again to Figure 5, rigidly mounted on the lower ends of arms 52 and 54 is a motor dead shaft 60, which provides mounting means for the electrode motor and carries a pair of electrode elements 18 (see also Figure 1). The motor stator core 64, carrying stator windings 66, is mounted at the center of shaft 60 between flange 62, at the left, and nut 68 and lock washer 70, at the right.

The rotor of the electrode motor is carried in a drum-like casing 71 having a cylindrical shell portion 76 and end frames 74. Casing 71 is mounted through end frames 74 upon ball bearing units 72 which are carried by shaft 60. End frames 74 are provided with flanges which extend into the ends of shell 76 and are held in place by screws 77. Mounted in the center of rotor shell 76, and surrounding stator core 64, is rotor core 78. Rotor core 78 is held in place against shoulder 80, at the left, by ring 82, at the right, which is secured by a plurality of screws 84 extending inwardly from shell 76. Rotor core 78 carries a squirrel-cage winding having end rings 79 and cross-bars (not shown).

The two electrode elements 18 are mounted between shoulders 86 upon shell 76 and flanges 88 upon end frames 74. These two electrode elements 18 are similar but are positioned in opposite relationship (see also Figure 1) and held from relative movement by key 90 (Figure 5). Key 90 is mounted upon shell 76 and extends through slots in the adjacent edges of electrode elements 18. Assembly of toroidal electrode elements 18 and end frames 74 upon rotor shell 76 is facilitated by pins 92 which extend from the ends of rotor shell 76 through holes in end frames 74.

In addition to electrical advantages, this particular method of mounting the two electrode elements 18 gives the rotor units a dynamic balance. However, adjustment to compensate for any deviation from accurate dynamic balance may be facilitated by drilling holes in end frames 74. Cover plates 94 are held in place upon end frames 74 by suitable screws.

In this embodiment, stator windings 66 (Figure 5) comprise a starting winding and a main winding, one lead from each of which is attached to shaft 60 through clip 96. The other end of the starting winding is connected to a lead 98, and a lead 99 is connected to the other end of the main winding. Leads 98 and 99 extend to the left through a suitable opening in shaft 60 and upwardly through a groove 100 in the outer face of arm 52. In assembly, arm 52 is in contact with the adjacent arm of the next electrode assembly unit, thus closing groove 100 and completing a conduit for leads 98 and 99 from within casing 71 to elongated frame 48.

Referring to the complete assembly in Figure 1, wherein certain of the electrical elements are shown diagrammatically, mounted at the right upon the ring portion 47 of the insulating support is a casing 252 (shown in broken lines) which encloses a condenser 253 and a safety fuse 254. The leads 98 from the starting windings of the three electrode assembly units at the right are connected to lead 44 through this condenser and this safety fuse. In a like manner, the starting windings of the three electrode assembly units on the left are connected to lead 44 through a condenser 253 and safety fuse 254 mounted in a casing 252. Leads 99 from the main windings of the six electrode assembly units are all connected directly to lead 44. Thus, one side of each of the starting and main windings is connected to one side of the secondary winding of insulation transformer 36.

As pointed out above, the other side of the secondary winding of insulation transformer 36 is connected to lead 32 and this lead is electrically connected to one side of each of the starting and running windings of the various electrode assembly units. This connection between lead 32 and each of the windings is made by connecting lead 32 directly to elongated frame 48 which, in turn, is electrically connected through the mechanical contacts to the structural elements of each of the electrode assembly units; this connection to each unit is through its inverted-U-bracket having cross-frame 56 and arms 52 and 54, and its dead shaft 60 to which the windings are connected by a clip 96. Thus the output voltage of the insulation transformer 36 (Figure 1) is delivered to each of the electrode windings 66 in an efficient and dependable manner. The rotation of the electrodes may be controlled at the source of the power input to insulation transformer 36 through suitable switching mechanism generally indicated at 222.

At the same time, the high-potential side of the high-frequency, high-potential auto-transformer 6 is carried by lead 32 through high tension terminal 34 to elongated frame 48 of the upper electrode structure 2. Because the various elements of the entire upper electrode structure 2 are electrically interconnected through the supporting mechanical contacts, an electrical connection is maintained between lead 32 and the electrode elements 18; this connection is through the inverted-U-brackets, the dead shafts 60, the ball bearing units 72 and casings 71. Accordingly, all of the electrode elements 18 are maintained at substantially the same potential, the potential of the high side of the auto-transformer 6.

As pointed out above, electrode elements 18 (Figure 5) are structurally similar, but are mounted in reversed or opposed relationship (see also Figures 1 and 7). Each electrode element 18 is a metallic shell having a toroidal discharge surface, the axis of which is at an angle to the axis of rotation. The discharges between the lower electrode structure 4 and each rotating electrode element 18 are at all times concentrated at the portion of the surface of the electrode element 18 nearest the lower electrode structure 4 which shall be referred to as the "active discharge surface." Due to rotation of electrode element 18, the active discharge surface is constantly changing; and due to the angular relationship between the toroidal discharge surface and its axis of rotation, the active discharge surface is constantly moving laterally with respect to the lower electrode structure 4.

With one of the units in the position shown in Figure 5, the active discharge surfaces of the two electrode elements 18 are adjacent each other, near the central portion of casing 71. During the rotation of the electrode unit through 180° from the position shown in Figure 5, the portions of the electrode elements 18 at the top are moved to the bottom and the active discharge surfaces gradually move from adjacent the central portion of casing 71 to the two ends of casing 71. During further rotation through 180°, electrode elements 18 are moved back to the position shown in Figure 5, and the active discharge surfaces are moved toward the central portion of casing 71 again. It is thus seen that the active discharge surface on the electrode element 18 at the right has moved to the right and then to the left, while the active discharge surface of the electrode element 18 at the left has moved to the left and then to the right. Thus, during rotation of the electrode elements 18, the active discharge surfaces are constantly oscillating in lateral directions.

As pointed out above, the lower electrode structure 4 (Figure 1) comprises a plurality of electrode elements 118 (see also Figure 3), each of which forms a part of an electrode roller 10; the outer casing of roller 10 comprises dielectric shell 114 of a material such as quartz or low power-factor glass. Dielectric shell 114 is hollow with the left end closed and reduced to form a bearing portion 108. Electrode element 118 is rigidly attached to a tube-extension 120 by way of a tube 116, all of which parts are positioned along the axis of dielectric shell 114; tube-extension 120 is cemented in place. Moisture-free ground quartz surrounds tube 116 and electrode element 118 in a manner to be more fully pointed out hereinafter. Near the left end of tube-extension 120 are two radially extending holes 121 forming passageways to the body of ground quartz. Adjacent holes 121 is a sealing cork 122, and a pivot shaft 110 fits within tube-extension 120 being held in place by a set screw 110'. A ball support 112 is secured to pivot shaft 110 and rests in a socket in reenforcing member 123 to assist in supporting roller 10.

In assembly of an electrode roller 10, the various elements are dried and the metallic unit, comprising the electrode element 118, tube 116, and tube-extension 120, is properly positioned within dielectric shell 114 and secured in place by cement around tube-extension 120. With the roller standing on its reduced end portion 108, ground quartz is poured into tube-extension 120 and through holes 121, until it entirely surrounds electrode element 118 and tube 116; sealing cork 122 is then driven into place by pivot shaft 110 which is secured in place by set screw 110'. In this manner, electrode rollers of highly practical and sturdy construction are provided which are efficient in supporting and moving the product during treatment, and, at the same time, form the lower electrode and dielectric structure.

These electrode rollers 10 are mounted in parallel relationship as shown in Figures 2 and 4; the right end (Figure 4) of each roller is mounted upon and electrically connected to vertical condenser members 22 by pivot shafts 110; and the left end of each roller is supported upon an insulating bridge structure including a side bridge 104 (see also Figure 1) and a supporting plate 111 (Figure 4). Supporting plate 111 is connected to bridge 104 by two rows of brace rods 109 held in place by cap screws 209. This entire bridge structure, including side bridge 104, supporting plate 111, brace rods 109 and cap screws 209, is formed from solid dielectric material such as "Bakelite."

Referring to Figures 1 and 2, side bridge 104 is supported at its ends by frames 15 and 17 which carry pulleys 14 and 16 respectively. Supported upon the upper row of brace rods 109 (see also Figure 4) and extending between pulleys 14 and 16 is a belt supporting plate 107 of anti-friction insulating material. The upper span of belt 12 lies upon the upper surface of plate 107, and the adjacent portions of electrode rollers 10 rest upon belt 12. Rigidly mounted upon side bridge 104 to receive the reduced end portion 108 of each electrode roller 10 is a bearing 106 of insulating material. Bearings 106 are U-shaped to prevent horizontal movement of rollers 10, while permitting free vertical movement. Thus the electrode rollers 10 are held in alignment but rest freely upon belt 12, and, accordingly, movement of belt 12 imparts rotation to rollers 10.

More particularly, electrode rollers 10 are held in alignment with one end supported in a fixed pivot and the other end supported upon the upper span of belt 12. Consequently, if the upper span of belt 12 is moved to the right (Figure 1), due to clockwise rotation of pulley 14, electrode rollers 10 will be rotated counterclockwise. Therefore, any materials which rest upon electrode rollers 10, such as packages of a product being treated, will be moved to the left successively across the electrode rollers 10 through the treatment zone.

As pointed out above, the materials being treated are moved to the treatment zone over a series of rollers 9 and are moved from the treatment zone over a series of rollers 11. In this embodiment, rollers 9 and 11 are supported and rotated by structure similar to the supporting structure for electrode rollers 10; thus rollers 9 and 11 are carried upon and rotated by the upper span of belt 12 and held in alignment by suitable bearings 106 (see Figure 2). Rollers 9 are additionally supported in suitable bearings on center bridge 128 while rollers 11 are additionally supported by similar bearings on bridge 130.

The particular type of vertical condenser member 22 shown (see Figure 4), comprises a metallic tube with rounded plugs 21 and 23 inserted in its ends and a reenforcing member 123 positioned to receive ball support 112 which carries the adjacent end of electrode roller 10. Vertical condenser member 22 is held in upright position on bridge 124, by screws 126, and bridge 124 is supported upon two legs, shown best in Figure 1. A plurality of brace rods 239 (Figure 4) are provided between support plate 111 and bridge 124 and secured in position by cap screws 240.

In addition to mechanical advantages, rounded plugs 21 and 23 act as static shields for the vertical condenser members 22, the general configuration of the condenser members 22 being such as to avoid excessive electrical stress and thus prevent sparking. Vertical condenser members 22 are spaced a predetermined distance from the adjacent flat surface of one wall 214 of casing 210, thus casing wall 214 and the condenser elements 22 form individual condensers of predetermined capacity. Under certain circumstances, an additional flat condenser plate may be positioned inside wall 214.

Referring to the right-hand portion of Figure 2, power from electric motor 170 is delivered through shaft 172 to belt 12 through pulley 14, there being a suitable speed reducing mechanism within pulley 14. However, auxiliary means is provided to facilitate the delivery of this power to belt 12 without danger of slippage on pulley 14. Mounted above and below pulley 14 (Figure 1), are two hugger pulleys, 174 and 176, respectively. To the right of hugger pulley 176 is tension pulley 178, which is mounted between two swinging arms upon shaft 180 and is weighted downwardly. These pulleys 174, 178, and 176 carry hugger belt 132 which contacts the outer surface of belt 12 and exerts pressure thereon so as to hold belt 12 into contact with pulley 14. The tension of hugger belt 182 is fixed by the weight of pulley 178. Thus, belt 12 is held firmly against pulley 14 and slipping of pulley 14 with respect to belt 12 is effectively avoided. At the left of Figure 1, flanged idler pulley 184 is mounted adjacent pulley 16 to guide belt 12. In this manner, a large amount of power may be delivered to belt 12, and belt 12 may be reliably regulated and driven, with structure which does not interfere with the treating of the product.

Below pulley 16 is a cleaning brush 186 which is carried by swinging arm 188, pivotally supported at 190, and is held in contact with belt 12 by weight 192 so as to remove any undesirable materials from belt 12.

Directly above pulley 16 is metallic roller 194 over which the packages of material pass as they are discharged from the machine. Roller 194 is grounded and effectively removes any static charge which may be present on the package.

The structure shown is admirably adapted for use in treating cylindrical packages of materials, such as packages 5 as shown in Figure 4. Packages 5 enter the casing endwise at the right (see also Figure 1) through opening 226 and move between rails 132 across rollers 9. As a package moves onto the first electrode roller 10 between rotatable rails 19, as shown in Figure 4, the right side of its forward end contacts the right hand rail 19. Rails 19 are at an angle to the initial path of movement of the package (Figure 2) and consequently further movement of the package while engaging the right rail 19 (Figure 4) rolls the package counterclockwise. Rails 19 are so positioned with respect to the axes of electrode rollers 10 that a package moving through the treatment zone is rolled preferably 180°. This rolling movement of package 5 constantly changes the position of the various portions of the package walls and the product with respect to the electrodes, and as the discharges occur, the relationship between the discharges and the various portions of the product and the package walls is constantly changing.

Under some circumstances, it is expedient to treat cylindrical packages of materials after the lid has been placed in position, but not sealed. Rollers 9 and 11 and electrode rollers 10 tend to push the packages and aid in holding these unsealed lids in place.

As best shown in Figure 1, each electrode element 18 is positioned directly above two electrode rollers 10, and the axis of rotation of elements 18 is at an angle slightly less than a right angle (Figure 2) with respect to the axis of electrode rollers 10. The most effective discharges from each electrode element 18 take place between it and the two electrode rollers beneath it. As the effective discharge surface of each electrode element 18 moves axially with respect to the electrode rollers 10, in the manner explained in connection with the discussion of Figure 5, the effective discharge surface of electrode element 18 moves from a position over one electrode roller 10 to a position over another electrode roller 10. It is thus seen that the distances between the effective discharge surface of each electrode element 18 and the two electrode rollers 10 beneath it is constantly changing so that if the high potential impressed across the electrode structures 2 and 4 remained constant, the potential gradient across each portion of the discharge zone 3 would change continually due to the rapid rotation of electrode elements 18.

However, the source of power is alternating, and the potential across electrode structures 2 and 4 therefore constantly changes at a rate dependent upon the frequency. Thus, there is a rapid fluctuation of potential gradient within the treatment zone between zero and a predetermined maximum which results from the high-frequency and the high speed rotation of electrode elements 18. At the same time, the dielectric constants of a package and of air are quite different. Therefore, as the potential gradient rises and a package moves through the treatment zone, displacing air, the air in the treatment zone above and below the package and surrounding the product within the package is overstressed and discharges occur. However, due to the constantly varying conditions, the potential gradient within the treatment zone will soon fall to a value which is too low to sustain the discharges. Consequently these discharges are of extremely short duration.

By adjusting the position of upper electrode structure 2 with respect to the lower electrode structure 4 to determine the dimensions of the treatment zone, and then adjusting the high potential which is impressed across the electrode structures 2 and 4, the maximum potential within the discharge zone may be fixed at a value to give maximum treating efficiency for the particular product being treated. Also, the speed of rotation of electrode elements 18, the rate of movement of the materials being treated, and the other factors, such as the frequency of the high potential, may be changed when desirable.

The high potential between electrode structures 2 and 4 may be varied over wide ranges to suit particular installations, but it has been found that voltages between 30,000 and 200,000 are very satisfactory for certain uses. In a like manner, the frequency of the high potential may be varied, but a frequency of approximately 1,000 cycles per second has been found to be very satisfactory. In this embodiment, upper electrode elements 18 are rotated at a speed of approximately 3,500 R. P. M.

As indicated above, the packages are generally surrounded by air during treatment. Consequently, the discharges partially ionize the air resulting in the formation of such products as ozone and certain oxides, particularly oxides of nitrogen. These products are referred to herein as "air-ionization products" and it is desirable that they be removed from the treatment zone and from the casing 210 without leakage. Accordingly, casing 210 is substantially sealed except at openings 226 and 228 (Figure 1) where the products being treated are moved into and out of the casing and a discharge fan (not shown) is provided which constantly draws air in through these openings and discharges the air-ionization products from the casing through a conduit 258.

As pointed out above, during operation, the effective discharge surfaces of the upper electrode elements 18 are constantly being changed, the packages 5 are being turned or rolled (Figure 4) to change the relationship between the various portions thereof and the discharges, and the electrode rollers 10 are being rotated. These constant changes of the discharge surfaces and the materials associated with the discharges tend to maintain uniform conditions within the treatment zone by minimizing undesirable heating of the electrode elements and the packages, and by tending to eliminate sustained ionization of the air within the zone.

When packages 5 are moved through the treatment zone, it is desirable that a uniform treatment be given all of the packages. However, if a foreign substance, such as a small piece of metal, passes through the treatment zone, either inside or outside a package, an abnormally high current flows through the foreign substance and through the adjacent lower electrodes. This abnormal current may be great enough to cause an undesirable drop in the potential between the electrode structures 2 and 4, interfering with the normal treatment of the other packages within the treatment zone. The provision of an individual condenser element 22 for each electrode roller 10 limits the amount of current flowing through each electrode element, thus minimizing such undesirable effects.

As pointed out above, the upper electrode assembly units (Figure 5) are mounted in alignment upon elongated frame 48, each unit having a rotatable portion including a pair of electrode elements 18. In certain installations, the rotatable portions of alternate electrode assembly units rotate in one direction and the rotatable portions of the other electrode assembly units rotate in the opposite direction. Accordingly, as a package passes through the treatment zone, in the manner described above, the individual discharges from one pair of electrode elements 18 tend to approach the walls of the package in one direction, while the individual discharges from the next succeeding pair of electrode elements 18 tend to approach the same walls of the package from the opposite direction.

This reversed rotation of the various pairs of electrode elements 18 is obtained by making all of the electrode assembly units identical, as shown in Figure 5, and by placing the two arms 52 of two adjacent units side by side; thus assembled, two grooves 100 cooperate to form a conduit for the two pairs of leads 98 and 99. Under certain circumstances, it is desirable to rotate the electrodes on one side of frame 48 in one direction, and the electrodes on the other side of the frame in the opposite direction.

In this embodiment, there are illustratively six pairs, or a total of twelve, electrode elements 18, and twenty-four electrode rollers 10, there being a vertical condenser member 22 associated with each electrode roller 10. There is a particular relationship between the number of upper electrode elements 18 and the number of electrode rollers 10, which has been explained above; but it is understood that in certain installations, this relationship may not be desirable.

Figure 8:
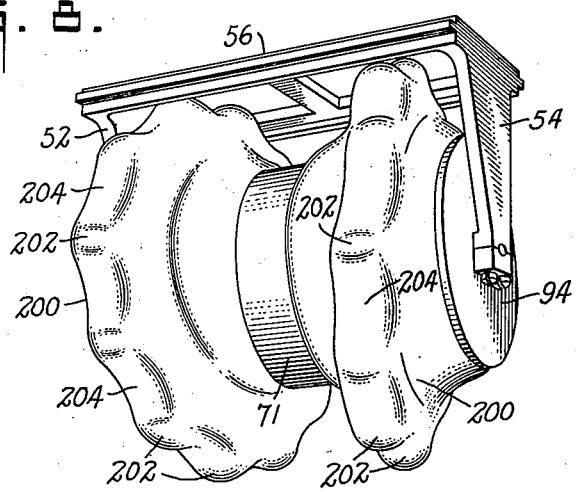
Figure 8 is a perspective view of a modified form of the upper electrode unit.

Figure 8 illustrates a modified form of the upper electrode elements which are mounted in the same manner as electrode elements 18 and which may be used to advantage in certain installations. In this embodiment, the toroidal elements 200 are undulated so as to provide a series of crests 202 and nodes 204. Crests 202 are the effective discharge portions of these electrode elements, and discharges occur when these crests approach the electrode elements 118 of the lower electrode structure.

It will thus be seen that I have provided a practical and efficient system and apparatus for accomplishing the several objects hereinabove mentioned as well as many others in a successful manner.

As many possible embodiments may be made of the mechanical features of the above invention and as the art herein described might be varied in various parts, all without departing from the scope of the invention, it is to be understood that all matter hereinabove set forth, or shown in the accompanying drawings is to interpreted as illustrative and not in a limiting sense.

I claim:

1. In electrical apparatus in which a product to be treated is subjected to a discharge resulting from impressing a high potential across electrode elements, the combination of, an annular electrode mounted to rotate in a vertical plane and having an effective discharge surface which includes portions spaced radially and axially from each other.

2. In electrical apparatus in which a product to be treated is subjected to a discharge resulting from impressing a high potential across electrode elements, the combination of, an annular electrode having an effective discharge surface area, the various portions of which are moved successively into and out of discharge position, said surface area having a portion which is substantially spiral in shape.

3. In electrical apparatus in which a product to be treated is subjected to a discharge resulting from impressing a high potential across electrode elements, the combination of, an insulating support and an electrode structure supported thereby, said electrode structure comprising a group of individual electrode elements, an elongated bracket supporting said individual electrode elements and metallic elements at the extremities of said bracket on opposite sides of said electrode elements.

4. In electrical apparatus in which a product to be treated is subjected to a discharge resulting from impressing a high potential across electrode elements, the combination of, an electrode unit including a motor having a rotor and a stator, and rigidly carried by bracket means, and a pair of annular electrode shells mounted with said rotor, each of said shells having an effective discharge surface thereon a portion of which is substantially spiral in shape.

5. In electrical apparatus in which a product to be treated is subjected to a discharge resulting from impressing a high potential across electrode elements, the combination of, a rotating electrode having its plane of rotation substantially at right angles to the path of movement of the product being treated, and a cooperating electrode structure having spaced cooperating discharge surfaces, said rotating electrode being non-symmetrical so that rotation thereof will cause a variation of the potential gradient within the discharge zone.

6. In electrical apparatus in which a product to be treated is subjected to a discharge resulting from impressing a high potential across electrode elements, the combination of, an upper electrode having an effective discharge surface a portion of which extends substantially spirally, and a plurality of roller electrodes each of which cooperates with a portion of said effective discharge surface.

7. In electrical treating apparatus, the combination of, means to move the product being treated in a given direction, means to deflect the product during movement thereof so that the product actually moves along a path which varies from said given direction, and an elongated electrode structure extending parallel to said path.

8. In electrical apparatus in which a product to be treated is subjected to a discharge resulting from impressing a high potential across electrode elements, an electrode roller including, a shell of dielectric material, a metallic electrode element within said shell, and a body of small particles of a solid dielectric material surrounding said electrode element.

9. In electrical apparatus in which a product to be treated is subjected to a discharge resulting from impressing a high potential across electrode elements, an annular electrode mounted to rotate in a vertical plane and having a toroidal effective discharge surface which is swashed with its axis at an angle to the center of rotation.

10. In electrical apparatus in which a product to be treated is subjected to a discharge resulting from impressing a high potential across electrode elements, an annular electrode mounted to rotate in a vertical plane and having a plurality of effective discharge surface portions which are spaced about the axis of rotation.

11. In electrical apparatus in which a product to be treated is subjected to a discharge resulting from impressing a high potential across electrode elements, the combination of, an annular electrode construction mounted to rotate about an axis which is substantially parallel to the direction of movement of the material being treated, said electrode construction having a plurality of effective discharge surface portions spaced radially about said axis and axially therealong.

12. In electrical apparatus in which a product to be treated is subjected to a discharge resulting from impressing a high potential across electrode elements, the combination of, an annular electrode having an effective discharge surface area a portion of which is substantially spiral in shape, and means mounting said electrode to rotate about an axis which is substantially parallel to the discharge zone—whereby the various portions of said discharge surface area are moved successively into and out of discharge position.

13. In electrical apparatus in which a product to be treated is subjected to a discharge resulting from impressing a high potential across electrode elements, the combination of, an insulating support and an electrode structure supported thereby, said electrode structure comprising a group of individual electrode elements, an elongated bracket supporting said individual electrode elements and metallic elements at the extremities of said bracket on opposite sides of said electrode elements, each of said metallic elements having an enlarged lower portion which is similar in shape to the contour of the effective portions of said electrode elements.

14. In electrical apparatus in which a product to be treated is subjected to a discharge resulting from impressing a high potential across electrode elements, the combination of, an electrode construction mounted to rotate about an axis which is substantially parallel to the path of movement of the material being treated, said electrode construction having a plurality of effective discharge surface portions which are spaced radially and axially about said axis in a definite pattern, and a plurality of elongated parallel electrodes which are positioned to cooperate individually with said effective discharge surface portions.

15. In electrical apparatus in which a product to be treated is subjected to a discharge resulting from impressing a high potential across electrode elements, the combination of, a first electrode having an undulated effective discharge surface a portion of which extends substantially spirally, and a plurality of parallel elongated cooperating electrodes extending substantially at right angles to the axis of said first electrode—whereby various portions of said first electrode successively cooperate with each of said elongated electrodes.

16. In electrical apparatus in which a product to be treated is subjected to a discharge resulting from impressing a high potential across electrode elements, the combination of, a pair of brackets, a fixed shaft extending between the ends of said brackets, a motor mounted upon said shaft and having a rotor with its axis substantially parallel to the path of movement of the material being treated, a pair of non-symmetrical electrode elements mounted with said rotor in a symmetrical manner to form a balanced rotating unit—whereby said electrode elements rotate together to move the various portions of their effective discharge surfaces into and out of discharge position.

17. In electrical apparatus in which a product to be treated is subjected to a discharge resulting from impressing a high potential across electrode elements, an electrode roller including, a shell of dielectric material having an opening at one end thereof, a metallic electrode element within said shell having a connection through said opening and an enlarged portion at the end opposite said opening, and a body of small particles of a solid dielectric material surrounding said enlarged portion of said electrode element.

18. In electrical apparatus of the character described, an electrode roller comprising, an elongated shell of dielectric material having an opening extending from one end, a metallic element extending axially through said opening and substantially along the entire length of said shell, said metallic element including an electrode element positioned within said shell remote from said opening, solid dielectrical material surrounding said electrode element, and sealing material sealing said metallic element to the walls of said shell at said opening and sealing said electrode element within said shell.

19. In electrical treating apparatus, the combination of, a conveyor to move the product being treated in a given direction through the treatment zone, a pair of dielectric bars positioned above and extending along said conveyor to deflect and guide the product during movement so that the product actually moves along a path which varies from said given direction, and an elongated electrode structure extending above and parallel to said path.

20. In electrical apparatus in which a product to be treated is subjected to a discharge resulting from impressing a high potential across electrode elements, an annular electrode mounted to rotate in a plane normal to the plane of the treatment zone and having an undulated toroidal swash discharge surface.

FRANKLIN S. SMITH.